United States Patent [19]

LeVert

[11] 4,277,727
[45] Jul. 7, 1981

[54] DIGITAL ROOM LIGHT CONTROLLER

[76] Inventor: Francis E. LeVert, 7233 S. Luella, Chicago, Ill. 60649

[21] Appl. No.: 63,359

[22] Filed: Aug. 2, 1979

[51] Int. Cl.³ .................................. H05B 37/02
[52] U.S. Cl. .................... 315/155; 250/221; 250/209; 315/159; 340/556
[58] Field of Search ............ 315/149, 157, 159, 155; 250/214 DC, 220, 221, 578, 209; 340/528, 556, 573; 328/5

[56] References Cited

U.S. PATENT DOCUMENTS

| | | | |
|---|---|---|---|
| 2,047,665 | 7/1936 | Beggs | 250/221 X |
| 2,065,048 | 12/1936 | Burnside | 250/221 X |
| 4,009,389 | 2/1977 | Lindholm | 250/221 |

FOREIGN PATENT DOCUMENTS 52-49677  4/1977  Japan ........................... 315/159

Primary Examiner—Eugene R. LaRoche

[57] ABSTRACT

A digital room light controller comprising optical emitters—sensors, a digital up/down counter, associated transistor—transistor logic(TTL) and solid state relay(SSR) has been constructed. The combination of optical emitters—sensors, TTL logic, up/down counter and SSR, which, when positioned in a doorway of a room, will maintain an electric light bulb in an on or off state depending on the accumulated count in the counter. The digital light controller increments the total count by +1 (i.e. counts up) in the counter when the room is entered and increments the count by −1 (i.e. counts down) when an exit is made from the room. A count of zero causes the interruption of electric power at a selected light fixture, while a non-zero count in the counter insures the maintenance of electric power at the fixture. Therefore a room light is maintained in an off state when the room is not in use.

4 Claims, 3 Drawing Figures

DIGITAL ROOM LIGHT CONTROLLER

BACKGROUND OF THE INVENTION

This invention relates to the automatic control of artificial light in a room to prevent the inefficient use of electric power in little used areas of one's home or business. The most commonly used means for disrupting the electric power to an electric light consist of passive mechanical contactors (switches) requiring human intervention. Active devices used to disable electric lights are also available (some of which utilize optical emitters—sensors to control the artificial illumination in a room), however none of these units have the necessary entry/exit logic of the device of this invention. Less sophisticated controllers that turn room lights off unless overridden by periodic human intervention also exist. Most of these devices, like mechanical switches, have as their primary purpose the reduction of electric power consumption during periods when either artificial illumination is not required or the area in question is not in use.

It would be useful to have a device that would turn on a room electric light when it is entered and maintain the light in the on-state as long as the room is occupied unless manually overridden. A device whose energy consumption per unit time would be very small when compared to that consumed by commonly used light bulbs per unit time. It would be particularly useful to have a device to turn lights off in unoccupied restrooms and other public rooms in business establishment (e.g. copy rooms without relying on human intervention).

It is an object of the present invention to provide a device to maintain the artificial illumination of a room in the off-state when it is unoccupied and to maintain the artificial illumination in the room in an on-state during periods of human residency.

It is further object of the present invention to provide an automatic room light controller for attachment to doorways. Other objects will become apparent in the course of a detailed description of the invention.

SUMMARY OF THE INVENTION

An automatic room light on/off-state controller comprises triggering devices, TTL logic, an up/down synchronous counter, a decoder and a TTL logic compatible solid state relay. The triggering devices consist of infared emitters and three photodetectors which are positioned on opposite sides of a passage way and the associated electronic components. The photodetectors are separately coupled via voltage dividers to three independent NAND gates. The outputs of the NAND gates are normally high when the infared light is incident on the base of the photodetectors. The photodetectors used in the device of this invention are phototransistors and will henceforth be referred to by the acronym PT. When the infared light falling on either of the PT's is interrupted the output of the NAND gate coupled to that PT goes low. The output of triggering circuit is fed into an ordinary TTL logic circuit which is designed to trigger, after other logic conditions are satisfied, the count up or count down logic in an ordinary synchronous up/down counter (U/D counter). The TTL logic is designed to cause an increment of +1 to the accumulated count of the counter only if a complete entry into the room is made. Likewise the TTL logic is designed to increment the accumulated count in the counter by −1 when a complete exit is made. The output of the U/D counter is decoded and used to drive a TTL logic compatible solid state relay which controls the flow of current to an electric light. The decoder output is low if the accumulated count is non-zero or high if the accumulated count is zero.

The electric light controller is designed to prevent false counts-up or down—by using three independent photo sensitive transistors that must be triggered in a predetermined manner in order to cause a positive or negative count increment in the counter.

DETAILED DESCRIPTION OF THE INVENTION

Figure 1:
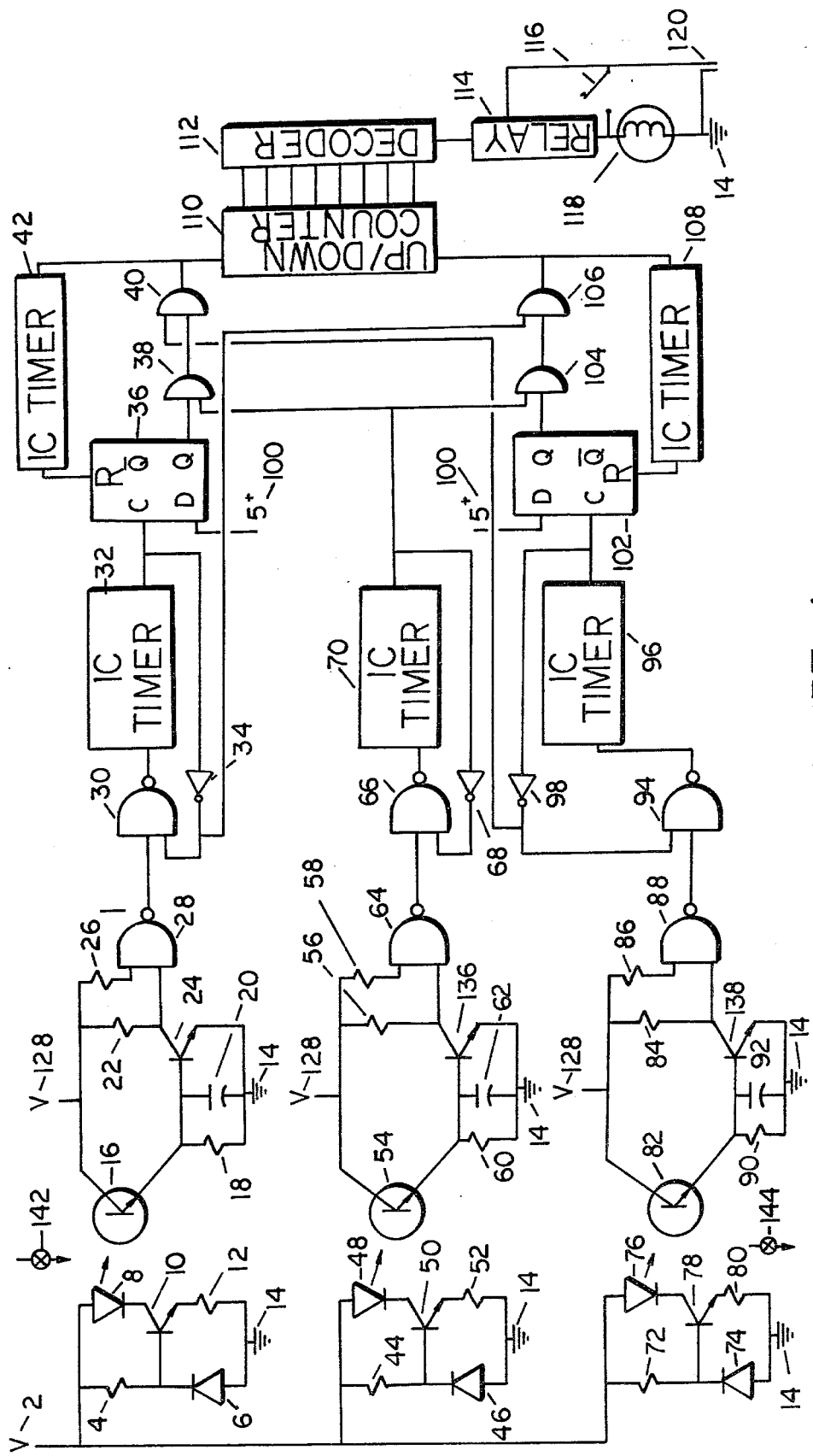
FIG. 1 is a schematic drawing of the digital room light controller of the present invention.
Figure 2:
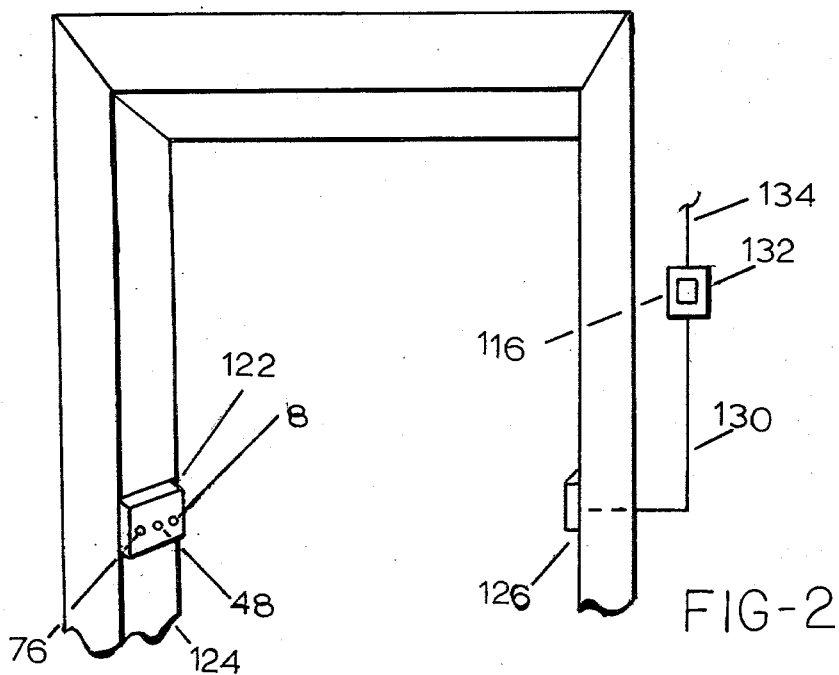
FIG. 2 shows the deployment of the digital room light controller with the emitters and photodetectors disposed on opposite sides of a doorway at the same height with the logic circuitry for the digital room light controller housed in a small enclosure and attached to a normal switch box.

FIG. 1 is a schematic drawing of the digital room light controller. In FIG. 1 infared light emitting diode (IRED) 8 is forward biased by direct current (DC) voltage source 2. The IRED 8 is electrically connected to the collector of transistor 10. The DC voltage source 2 is electrically connected to resistor 4 which in turn is connected to the base of the transistor 10. Also electrically connected to the base of said transistor 10 is zener diode 6 which holds the base of said transistor 10 at a constant voltage. The emitter of transistor 10 is connected to electrical ground 14 via resistor 12. This circuit insures a constant output of said IRED 8. The output of said IRED 8 is incident on PT 16 which is connected electrically by way of its collector to DC bias supply 128. The emitter current of the PT 16 is fed to resistor 18 and capacitor 20, which are in parallel, and to the base of transistor 24. The DC bias supply 128 is electrically connected to the collector of the transistor 24 via resistor 22 and by resistor 26 to one of the inputs of two input NAND gate 28. The NAND gate 28 is one component of a series of electrical components that will, henceforth, be referred to, collectively, as channel one. The emitter of said transistor 24 is electrically connected to electrical ground 14. PT 16, resistor 18, capacitor 20, transistor 24, resistor 26 and NAND gate 28 make up the electrical circuit which provides a logic pulse when said IRED 6's beam is prevented from reaching PT 16 as by a person entering or exiting through a doorway where the device of this invention is mounted. FIG. 2 shows the device of this invention mounted on a doorway. Three electrical circuits containing the same kind of conponents are electrically connected as shown in FIG. 1. The remaining two electrical circuits for generation of infared beams (IR) are made up of: resistor 44, IRED 48, transistor 50, zener diode 46, resistor 52 and resistor 72. IRED 76, transistor 78, zener diode 74 and resistor 80, respectively. All three infared emitting circuits are driven by bias voltage supply 2 and are housed together in IR emitter's housing 122.

NAND gate 28 is electrically connected to NAND gate 30. The output terminal of NAND gate 30 is connected to the input of integrated circuit timer (ICT) 32. The ICT 32 (a commercially available integrated circuit timer) is operated in a monostable mode and is triggered or driven high by a negative going pulse of predetermined width. This pulse is fed forward to the clock input of a D-type flip-flop (DFF) 36 and back through logic inverter 34 to one of the inputs of the NAND gate 30 via electrical connections. By electrically feeding back the inverted output of ICT 32, multiple triggering of said NAND gate 28 during a predetermined time interval is prevented. The DFF 36 is edge triggered and has impressed upon its D input positive DC bias 100. Normally, DFF 36 is in a low state and is driven high by the falling edge of the output pulse of said ICT 32. Said DFF 36 is electrically connected to two input AND gate 38. The inverted output of said ICT 32 is also fed to AND gate 106. The logic condition necessary to trigger AND gate 38 is satisfied by a voltage pulse from ICT 70 when that component is triggered. The ICT 70 which is a part of channel two is driven in to a high state by NAND gate 66. The NAND gate 66 is part of an electrical channel in which PT 54 is the first electrically connected component. The PT 54 collector is electrically connected to said DC bias supply voltage 128 and its emitter is electrically connected to resistor 60, capacitor 62 and to the base of transistor 136. The transistor 136 collector is connected to the supply voltage 128 as by resistor 56 and to one of the inputs of NAND gate 64 via resistor 58. The output of NAND gate 64 is used as input to NAND gate 66 which triggers ICT 70. Multiple triggering of ICT 70 is prevented by feeding back a lock out pulse via inverter 68 to the input of said NAND gate 66. The ICT 70 output pulse width is set such that said AND gate 38 is held in a high state for an extremely short period of time. The instant said AND gate 38 goes high, dual input AND gate 40 is turned on. ICT 42 and U/D counter 110 which are electrically connected to AND gate 40 are triggered by when AND gate 40 goes high. U/D counter 110 is triggered by the positive pulse from AND 40 and the ICT 42 is electrically connected to the reset of DFF 36 and drives back to a low state. The output of U/D counter 110 is fed via electrical connections to eight input NAND decoder 112. The NAND decoder 112 is electrically connected to SSR 114. Said SSR 114 is electrically connected to electric bulb 118. The SSR 114 can be manually overridden by contact switch 116.

The DFF 102 is one electronic component of electrical channel three which, like channel two, is composed of electrical components with identical functions and characteristics as those in channel one. Said DFF 102 is electrically connected to multi-input AND gate 104. The multi-input AND gate 104 is electrically connected to dual input AND gate 106. The dual input AND gate 106 is electrically connected to ICT 108 and to the down input of the U/D counter 110. The output of ICT 108 is electrically connected to the reset input of said DFF 102.

The electronic components described in this disclosure could have equally as well been fewer in number and different in type to develop the necessary logic to control the artificial lighting in a room. The components used were of ordinary type and readily available. FIG. 2 shows IRED's 8, 48, 76, and associated circuitry housing 122 mounted on door frame 124. IRED sensors, U/D counter, and associated TTL logic circuitry housing 126 is shown mounted on door frame 124. Electrical lead 130 electrically connects the electrical circuit in housing 112 to switch box 132 which in turn is electrically connected to electric lamp 118 by electrical lead 134.

Figure 3:
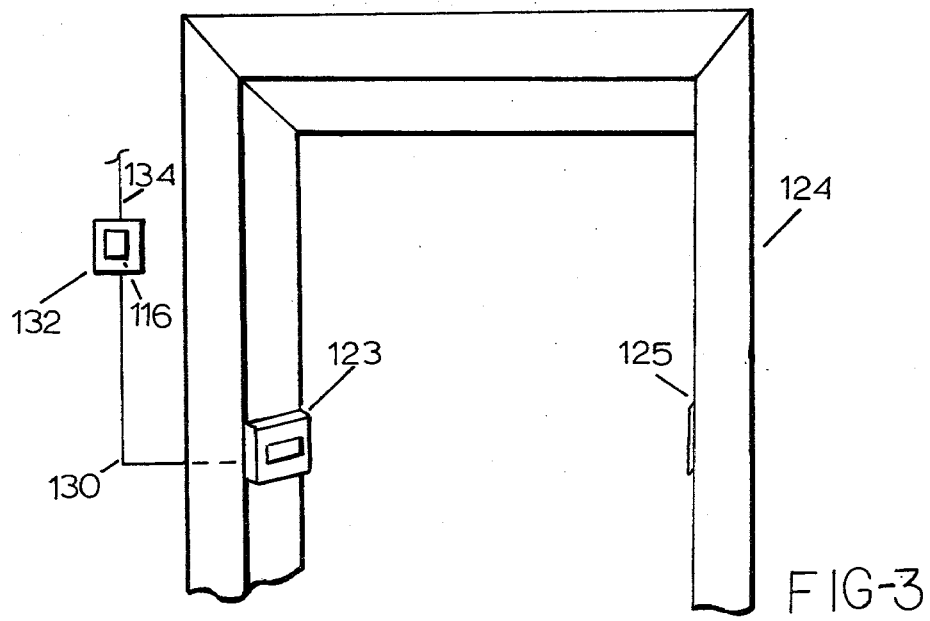
FIG. 3 shows the digital room light controller with the emitters and photodetectors located in the same housing and a set of reflectors positioned directly opposited the emitter-photodetectors units.

FIG. 3 shows IRED's 8, 48 and 76 and photodetectors 16, 54, and 82 along with associated electronic circuitry which are housed in cabinet 123 mounted on door frame 124 with reflectors 125 mounted on the opposited side of door frame 124.

Operation of the invention of FIG. 1 will now be explained. The IRED emitters 8, 50, and 76 are optically connected to PT's 16, 54, and 82. An individual moving from position 142 in the direction of position 144 will cause an interruption of the optical coupling between IRED 8 and PT 16. When this interruption occurs PT 16 ceases conducting and causes the bias at the base of transistor 24 to go low or approach ground level thereby driving the collector of transistor 24 high hence driving NAND gate 28 low. The bias voltage 128 is used to drive PT 16 and transistor 24 by way of the voltage divider composed of resistor 22 and resistor 26. The output of NAND gate 28 is fed to NAND gate 30 which is used to trigger monostable ICT 32. ICT 32 triggers on the falling edge of the output pulse of NAND gate 30 and is electrically connected to the clock input of DFF 36 which remains on until turned off by ICT 42. The DC output of DFF 36 is applied to the multi-input AND gate 38. As the individual traverses the doorway in the direction of position 144 to the position where the IR beam between IRED 50 and PT 54 is interrupted, events are set into motion which causes NAND gate 64 to be turned off. When NAND gate 64's output goes low the logic of NAND gate 66 is satisfied and its output goes high where it remains until NAND gate 64 is driven back to a high state when the beam coupling IRED 48 and PT 54 is no longer interrupted. At the instant that NAND gate 64 returns to a high state NAND gate 66 is driven back to its low state resulting in ICT 70 being driven into a high state. With the logic condition at AND gate 38 satisfied by the output voltage from ICT 70, a DC signal is inputed from AND gate 38 to AND gate 40. The width of the output of ICT 70 is chosen such that it remains on an amount of time less than that required for movement by a person through the doorway to a position where the beam coupling IRED 76 to PT 82 is interrupted. Once the IR beam coupling IRED 48 and PT 54 is interrupted the output of ICT 70 triggers AND gate 38 which is conjunction with the output of said inverter 98 triggers AND gate 40, resulting in a positive pulse at the input of U/D counter 110 whose accumulated count is incremented by +1. When AND gate 38 returns to a low state it causes AND gate 40 to return to a low state thereby turning ICT 42 on. ICT 42 is used to reset DFF 36. If the accumulated count in the U/D counter 110 is zero the addition of plus one causes the decoder 112 to input a voltage to TTL compatible SSR 114 which permits the flow of electrical current through the electric bulb 118 from alternating current supply line 120. If the person in the foregoing example leaves the room the logic is reversed, resulting, as the passing individual interrupts the IR beam between IRED 48 and PT 54, in an electrical pulse at the AND gate 106. AND gate 106 provides a DC pulse to the down input of U/D counter 110 resulting in a minus 1 being added to the accumulated count (+1) of the U/D counter, which results in an accumulated count of zero and an interruption of voltage at the light bulb 118.

The timing intervals of ICT 32, 70 and 96 are crucial in terms of the proper operation of the invention and must be chosen properly such that directional sensing capability of the device is fully utilized.

The device of this invention is equipped with an override switch 116 which allows the device to be manually overridden.

What is claimed is as follows:

1. Apparatus for turning a light on when a person enters an unoccupied room and maintaining a net count equal to the difference between the number of persons entering and leaving the room so as to automatically maintain the room light in an on position when the total count is greater than zero or to maintain the room light in an off position when the total count is zero comprising: three emitters of invisible light adapted to emit three beams of said light in a horizontal plane across a doorway; three beam sensors positioned in said doorway so as to sense an interruption of one or more said invisible light beams transmitted thereto;

electronic means cooperating with each one of said sensors for emitting a pulse of electric current for each interruption of each said invisible light beam;

electronic means for generating an electrical signal of finite duration in response to each said pulse of electric current;

electronic means for processing said signals so as to produce a first output pulse only when said signals are generated in a first predetermined sequence and for producing a second output pulse only when said signals are generated in a second predetermined sequence;

an up-down counter for counting said output pulses having the first output pulse applied to its UP input terminal and the second output pulse applied to its DOWN input terminal; and, electronic means for decoding the accumulated count stored in said counter and controlling the on/off state of the room lights in accordance therewith.

2. The device in claim 1 wherein the emitter and detector means are located in the same housing, with reflector means disposed horizontally opposite said emitter and detector means in a doorway.

3. The device of claim 1 wherein the beam sensors are positioned across said doorway opposite said beam emitters.

4. The device of claim 1 wherein the duration of said electrical signal is predetermined so as to minimize false counts under normal use.

* * * * *